(12) United States Patent
Naito et al.

(10) Patent No.: US 8,615,992 B2
(45) Date of Patent: Dec. 31, 2013

(54) CONSTRUCTION MACHINE

(75) Inventors: Keita Naito, Ishikawa (JP); Shunji Oka, Ishikawa (JP); Osamu Takatori, Ishikawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/634,441

(22) PCT Filed: May 19, 2011

(86) PCT No.: PCT/JP2011/061527
§ 371 (c)(1),
(2), (4) Date: Sep. 12, 2012

(87) PCT Pub. No.: WO2011/145684
PCT Pub. Date: Nov. 24, 2011

(65) Prior Publication Data
US 2013/0004279 A1    Jan. 3, 2013

(30) Foreign Application Priority Data
May 20, 2010    (JP) ................. 2010-116018

(51) Int. Cl.
*F16D 31/02*    (2006.01)
*F15B 15/26*    (2006.01)

(52) U.S. Cl.
USPC ............ 60/442; 60/413; 60/421; 188/170

(58) Field of Classification Search
USPC ......... 60/413, 421, 435, 442; 91/44; 188/170; 303/71
See application file for complete search history.

(56) References Cited

U.S. PATENT DOCUMENTS 3,802,746 A * 4/1974 Walser .................. 188/170
4,458,791 A * 7/1984 Schneider et al. ......... 60/413
(Continued)

FOREIGN PATENT DOCUMENTS

| GB | 2 006 362 A | 5/1979 |
|---|---|---|
| GB | 2 427 664 A | 1/2007 |

(Continued)

OTHER PUBLICATIONS

International Search Report mailed Aug. 9, 2011 in International Application No. PCT/JP2011/061527 including English translation, 4 pages.

(Continued)

*Primary Examiner* — Michael Leslie
(74) *Attorney, Agent, or Firm* — Fish & Richardson P.C.

(57) ABSTRACT

A construction machine includes a negative parking brake whose braking state is released by a supply of hydraulic fluid. It also includes a parking brake hydraulic circuit that is branched from a hydraulic fluid supplying circuit, which supplies the hydraulic fluid to a transmission of the construction machine, and supplies the hydraulic fluid to the parking brake. The parking brake hydraulic circuit includes a check valve that prevents backflow of the hydraulic fluid of the parking brake to the hydraulic fluid supplying circuit, and it includes an operation switching valve, which is provided closer to the parking brake than the check valve, for switching between an activation and a release of the parking brake. The parking brake hydraulic circuit also includes a relief valve, which is interposed between the check valve and the operation switching valve and which discharges the hydraulic fluid of the parking brake when the relief valve is opened.

4 Claims, 3 Drawing Sheets

(56) References Cited

U.S. PATENT DOCUMENTS

| | | | |
|---|---|---|---|
| 4,858,435 A | | 8/1989 | Ikeda |
| 4,893,879 A | * | 1/1990 | Middelhoven et al. ....... 188/170 |
| 5,984,425 A | * | 11/1999 | Orzal ............................ 188/170 |

FOREIGN PATENT DOCUMENTS

| | | |
|---|---|---|
| JP | S52-079179 A | 7/1977 |
| JP | S54-067432 U | 5/1979 |
| JP | S57-107942 A | 7/1982 |
| JP | 63-180372 U | 11/1988 |
| JP | H02-243833 A | 9/1990 |
| JP | S52-009772 A | 1/1997 |
| JP | 2005-329814 | 12/2005 |
| JP | 2009-275875 A | 11/2009 |

OTHER PUBLICATIONS

Office Action issued Jul. 2, 2013 in corresponding Chinese application No. 201180013102.1, including partial translation, 6 pages.

\* cited by examiner

CONSTRUCTION MACHINE

CROSS-REFERENCE TO RELATED APPLICATIONS

This application claims priority to Application No. PCT/JP2011/061527, filed May 19, 2011, which application claims priority to Japanese Application No. 2010-116018, filed on May 20, 2010. The contents of the above applications are incorporated herein by reference in their entireties.

TECHNICAL FIELD

The present invention relates to a construction machine provided with a hydraulic circuit for a negative parking brake.

BACKGROUND ART

In a construction machine such as a wheel loader, a so-called negative parking brake that is activated by biasing force of a spring or the like obtained by discharging hydraulic fluid from a brake cylinder is employed (see, for instance, Patent Literature 1). In such a parking brake, the hydraulic fluid is supplied to the brake cylinder through a parking brake hydraulic circuit, thereby releasing the parking brake.

A parking brake hydraulic circuit of a construction machine is occasionally connected to a hydraulic fluid supplying circuit that supplies hydraulic fluid to a transmission so as to be supplied with the hydraulic fluid from the hydraulic fluid supplying circuit. In this arrangement, when the hydraulic fluid is flowed into the transmission in activation (e.g., gear shifting) of the transmission, fluid pressure of the hydraulic fluid supplying circuit may be temporarily decreased. When such decrease in the fluid pressure affects the parking brake hydraulic circuit, the hydraulic fluid is discharged from the brake cylinder to activate the parking brake, so that a brake-dragging phenomenon occurs during travelling.

In order to prevent this phenomenon, a check valve that prevents flowback of the hydraulic fluid toward the hydraulic fluid supplying circuit is provided in the parking brake hydraulic circuit. Even though the fluid pressure of the hydraulic fluid supplying circuit is temporarily decreased in activation (e.g., gear shifting) of the transmission, since the fluid pressure of the parking brake hydraulic circuit is kept at a predetermined value or more by the check valve, the parking brake is maintained in a released state.

CITATION LIST

Patent Literature(s)

Patent Literature 1: JP-A-2005-329814

SUMMARY OF INVENTION

Problems to be Solved by the Invention

However, in such an arrangement with the check valve, even when the fluid pressure of the parking brake hydraulic circuit becomes too high beyond the fluid pressure of the hydraulic fluid supplying circuit because of increase in the fluid pressure in accordance with increase in a fluid temperature during release of the parking brake, the check valve hinders the hydraulic fluid from being discharged from the parking brake hydraulic circuit. Consequently, the fluid pressure of the parking brake hydraulic circuit is kept at a high value, so that a device (e.g., a hydraulic sensor) and a pipe which are connected to the parking brake hydraulic circuit may be damaged.

To cope with this problem, it is considered to suppress increase in the fluid pressure of the parking brake hydraulic circuit by additionally providing a drill hole or a slit on the check valve, through which the hydraulic fluid is leaked toward the hydraulic fluid supplying circuit when the fluid pressure of the parking brake hydraulic circuit becomes higher than that of the hydraulic fluid supplying circuit. However, since a transmission used in a large-sized wheel loader or the like is provided with a large clutch in volume, a time required for gear shifting is long and the length of the time largely varies depending on situations. Accordingly, in accordance with the decrease in the fluid pressure of the hydraulic fluid supplying circuit during gear shifting, a leakage amount of the hydraulic fluid from the parking brake hydraulic circuit to the hydraulic fluid supplying circuit becomes too large, thereby decreasing the fluid pressure of the parking brake hydraulic circuit. Thus, provision of the check valve provides no advantages.

An object of the invention is to provide a construction machine provided with a parking brake hydraulic circuit capable of ensuring a suitable fluid pressure to reliably maintain a released state of a negative parking brake.

Means for Solving the Problems

A construction machine according to an aspect of the invention includes: a negative parking brake whose braking state is released by supply of hydraulic fluid; and a parking brake hydraulic circuit that is branched from a hydraulic fluid supplying circuit supplying the hydraulic fluid to a transmission of the construction machine and supplies the hydraulic fluid to the parking brake, in which the parking brake hydraulic circuit includes: a check valve that is provided closer to the parking brake than a branch portion from the hydraulic fluid supplying circuit and prevents backflow of the hydraulic fluid of the parking brake to the hydraulic fluid supplying circuit; an operation switching valve that is provided closer to the parking brake than the check valve and switches between an activation and a release of the parking brake; and a relief valve that is interposed between the check valve and the operation switching valve and discharges the hydraulic fluid of the parking brake when the relief valve is opened.

According to the construction machine provided with the parking brake hydraulic circuit in the above aspect of the invention, since the parking brake hydraulic circuit includes the check valve that prevents backflow of the hydraulic fluid of the parking brake to the hydraulic fluid supplying circuit of the transmission, even when the fluid pressure of the hydraulic fluid supplying circuit is decreased in activation (e.g., gear shifting) of the transmission, the check valve prevents the decrease in the fluid pressure of the parking brake. Moreover, since the relief valve is provided in the parking brake hydraulic circuit, when the fluid pressure of the parking brake is expected to increase by expansion of the hydraulic fluid in accordance with increase in a fluid temperature or the like, a predetermined fluid pressure can be ensured by discharging the hydraulic fluid of the parking brake. Consequently, a suitable fluid pressure required for releasing the negative parking brake can be ensured and a released state of the parking brake can be reliably maintained.

The above aspect of the invention is achieved by focusing on specific features of the construction machines in which a large amount of the hydraulic fluid is required, the fluid pressure largely fluctuates, and a leakage amount of the hydraulic fluid is difficult to control. Although a typical idea to cope with the above features is to provide a drill hole or a slit, the relief valve which may be a cost-up factor is additionally provided in the above aspect of the invention. In other words, the aspect of the invention is based on a technical idea beyond the typical idea, so that the aforementioned advantages can be obtained.

In the construction machine according to the above aspect of the invention, it is preferable that the relief valve discharges the hydraulic fluid of the parking brake to the hydraulic fluid supplying circuit when a difference in fluid pressure between the parking brake and the hydraulic fluid supplying circuit across the check valve exceeds a relief pressure.

With this arrangement, since a drain pipe for connecting the relief valve and the hydraulic fluid tank is not required, the structure of the parking brake hydraulic circuit can be simplified.

In the construction machine according to the above aspect of the invention, it is preferable that the parking brake hydraulic circuit includes: an accumulator that accumulates hydraulic fluid therein; a solenoid valve that supplies or stops the hydraulic fluid from the accumulator; and an emergency release valve that is provided in a hydraulic line from the operation switching valve to the parking brake and connects the parking brake and a hydraulic line from the solenoid valve by switching a valve position of the emergency release valve to release the parking brake, in which the emergency release valve comprises a first pilot line to which fluid pressure between the operation switching valve and the check valve is applied and a second pilot line to which fluid pressure of the solenoid valve is applied, and the valve position of the emergency release valve is switched when the fluid pressure of the second pilot line is higher than the fluid pressure of the first pilot line by a predetermined value or more.

With this arrangement, the parking brake hydraulic circuit includes the solenoid valve that supplies or stops the hydraulic fluid from the accumulator and the emergency release valve that connects the parking brake and the hydraulic line from the solenoid valve to release the parking brake. Accordingly, when the hydraulic fluid is not supplied to the parking brake for some reason, the hydraulic fluid is supplied from the accumulator to the parking brake through the emergency release valve, so that the parking brake can be forcibly released.

The emergency release valve is configured such that the valve position is switched when the fluid pressure of the second pilot line to which the fluid pressure of the solenoid valve is applied is larger by a predetermined value or more than the fluid pressure of the first pilot line to which the fluid pressure between the operation switching valve and the check valve is applied. Accordingly, under a high fluid pressure of the operation switching valve, namely, in a normal released state of the parking brake, this arrangement prevents the emergency release valve from being switched to forcibly bring the parking brake into a released state.

In the construction machine according to the above aspect of the invention, it is preferable that the construction machine is a wheel loader, and the construction machine is provided with a transmission transmitting an output of an engine to wheels, in which decrease in fluid pressure of the hydraulic fluid supplying circuit in accordance with a gear shifting of the transmission continues for a predetermined time or more.

With this arrangement, the construction machine is a wheel loader in which decrease in the fluid pressure of the hydraulic fluid supplying circuit in accordance with the gear shifting of the transmission continues for a predetermined time or more. In this case, since the decrease in the fluid pressure of the hydraulic fluid supplying circuit continues for a long time, when a drill hole or a slit is additionally formed in the check valve, a leakage amount from the check valve is increased to affect the parking brake to a large extent. In contrast, according to the aspect of the invention, since the relief valve is opened only when the fluid pressure of the parking brake exceeds the relief pressure, a suitable fluid pressure required for releasing the parking brake can be ensured even in the wheel loader of the above characteristics.

According to the aspect of the invention, a suitable fluid pressure required for releasing the negative parking brake can be ensured and a released state of the parking brake can be reliably maintained by providing the check valve and the relief valve in the parking brake hydraulic circuit of the construction machine.

DESCRIPTION OF EMBODIMENT(S)

First Exemplary Embodiment

Figure 1:
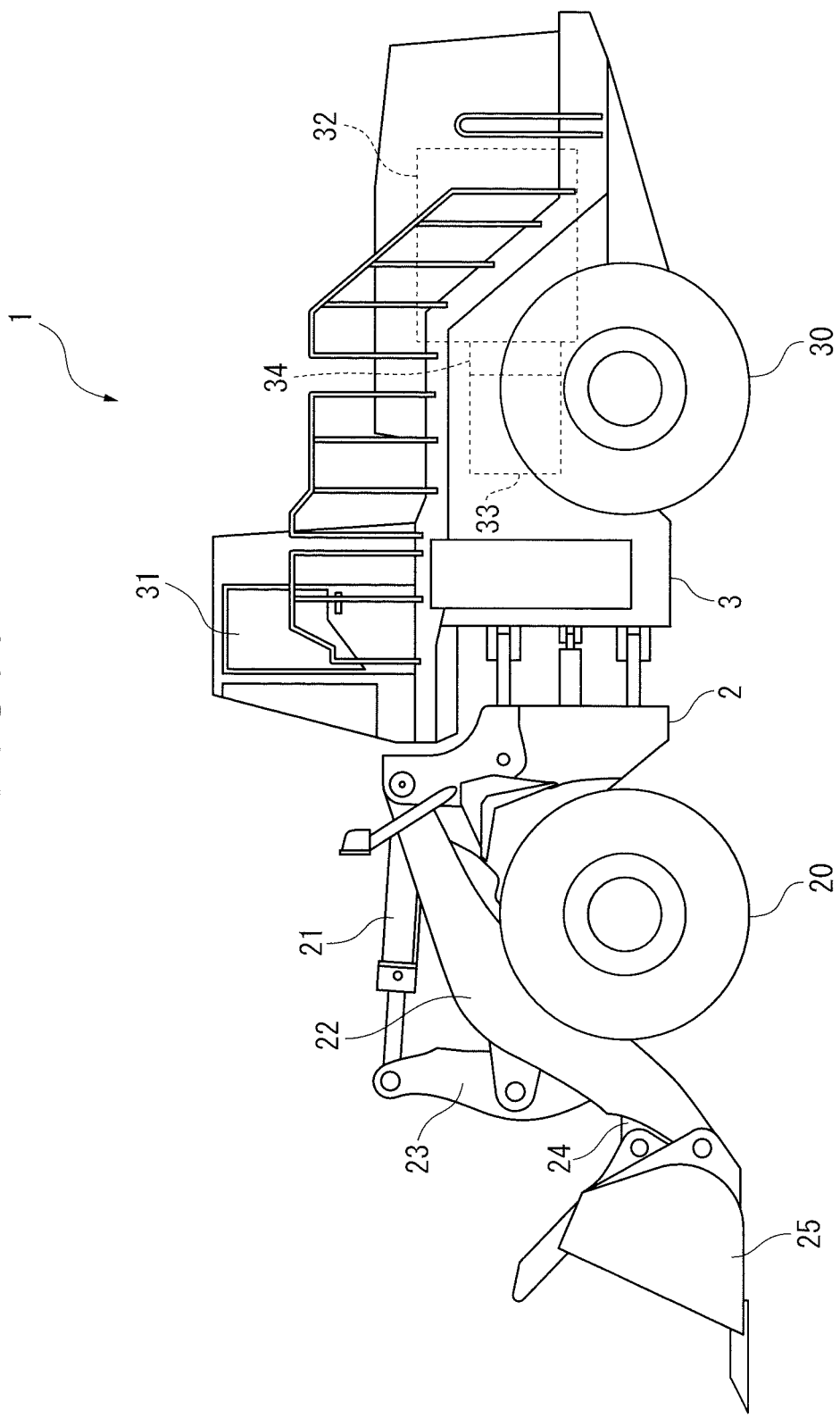
FIG. 1 is a side view showing a construction machine according to a first exemplary embodiment of the invention.

A first exemplary embodiment of the invention will be described below with reference to the drawings. In a later-described second exemplary embodiment, a component identical with or similar to that in the first exemplary embodiment described below will be denoted by the same reference numerals, and thus an explanation thereof will be simplified or omitted.

FIG. 1 is a side view showing a wheel loader 1 according to this exemplary embodiment.

In FIG. 1, the wheel loader 1 is a construction machine that excavates and delivers earth, sand and the like and loads them to a truck or the like. The wheel loader 1 includes a working-equipment frame 2 and a vehicle body frame 3.

The working-equipment frame 2 is swingable around a center pin (not shown) relative to the vehicle body frame 3 within a predetermined articulate angle range. In other words, the wheel loader 1 is an articulate-structured vehicle having the frames 2 and 3.

A cab 31 is provided on a front side of the vehicle body frame 3 and substantially in the center of the wheel loader 1. An operator in the cab 31 can operate the wheel loader 1. The vehicle body frame 3 is provided inside with an engine 32, a transmission 33, a torque converter 34, a working equipment pump (not shown) driven by the engine 32, a parking brake 4 and a parking brake hydraulic circuit 5 described later (see FIG. 2).

Output of the engine 32 is transmitted to a front axle on a side of the working-equipment flame 2 and a rear axle on a side of the vehicle body frame 3 via a front propeller shaft and a rear propeller shaft (not shown) connected to the transmission 33, thereby rotating front and rear wheels 20 and 30. By hydraulic fluid supplied from the working equipment pump, a tilt cylinder 21 provided in the working-equipment frame 2 is extended and retracted to tilt a bucket 25 through a boom 22, a bell crank 23 and a link 24. A lift cylinder (not shown) is extended and retracted to move a front side of the boom up and down, thereby moving the bucket 25 up and down.

Figure 2:
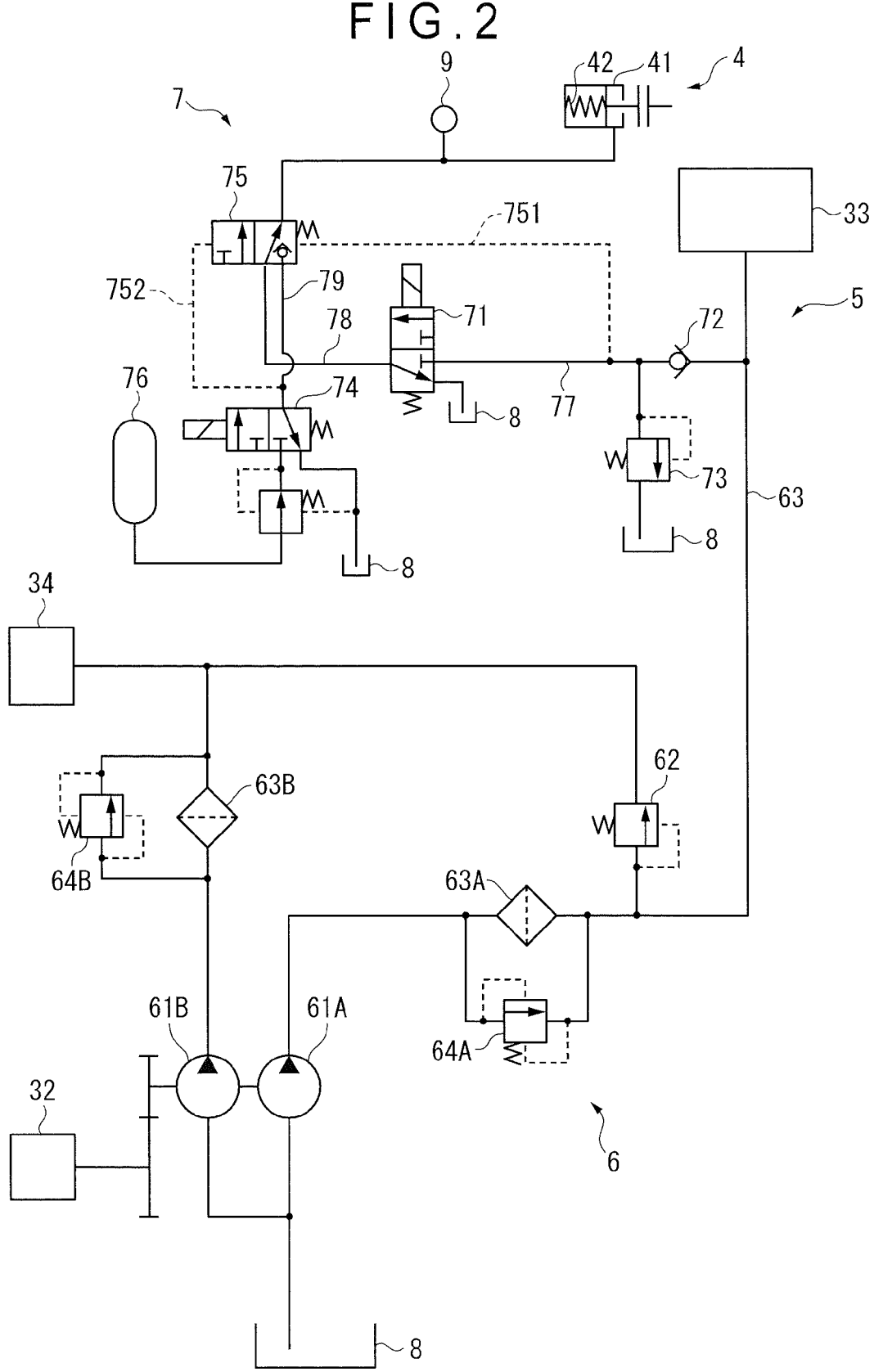
FIG. 2 shows an arrangement of a parking brake hydraulic circuit mounted in the construction machine.

As shown in FIG. 2, the parking brake 4 includes a brake cylinder 41 and a spring 42 and is provided in a casing of the transmission 33. The parking brake 4 is a negative parking brake. When hydraulic fluid in the brake cylinder 41 is discharged, biasing force of the spring 42 generates braking force on the parking brake 4. When hydraulic fluid is supplied into the brake cylinder 41, the parking brake 4 is released. Accordingly, when the engine 32 is stopped after the operation and use of the wheel loader 1 is finished, the hydraulic fluid is not supplied into the brake cylinder 41 due to the stop of the engine 32, whereby the wheel loader 1 is parked while the braking force is being generated on the parking brake 4.

The parking brake hydraulic circuit 5 includes a hydraulic fluid supplying circuit 6, an operation switching circuit 7, a hydraulic fluid tank 8, and a pressure sensor 9.

The hydraulic fluid supplying circuit 6 supplies the hydraulic fluid to the transmission 33 and the torque converter 34 as well as the parking brake 4. The hydraulic fluid supplying circuit 6 includes first and second hydraulic pumps 61A and 61B, first and second filters 63A and 63B, first and second relief valves 64A and 64B, and a main relief valve 62.

Each of the hydraulic pumps 61A and 61B is driven by the engine 32.

The first hydraulic pump 61A raises pressure of the hydraulic fluid in the hydraulic fluid tank 8 to supply the hydraulic fluid to the transmission 33 and the parking brake 4. The hydraulic fluid discharged from the first hydraulic pump 61A passes through the first filter 63A, whereby metal abrasion powders and other impurities in the hydraulic fluid are collected. The first relief valve 64A is provided so as to connect an upper stream side of the first filter 63A and a down stream side thereof. When a difference in pressure between the upper and down stream sides of the first filter 63A exceeds a predetermined relief pressure because of clogging of the first filter 63A or the like, the first relief valve 64A is opened to bypass the first filter 63A, thereby delivering the hydraulic fluid toward the transmission 33.

The second hydraulic pump 61B raises pressure of the hydraulic fluid in the hydraulic fluid tank 8 to supply the hydraulic fluid to the torque converter 34. The hydraulic fluid discharged from the second hydraulic pump 61B is delivered to the torque converter 34 through the second filter 63B. Here, when a difference in pressure between upper and down stream sides of the second filter 63B exceeds a predetermined relief pressure, the hydraulic fluid in the second hydraulic pump 61B bypasses the second filter 63B through the second relief valve 64B. The hydraulic fluid thus supplied to the torque converter 34 is returned to the hydraulic fluid tank 8 through a lubrication circuit (not shown). The circuit is configured such that pressure of the hydraulic fluid is, for instance, 0.98 MPa (10 kgf/cm$^2$) in the torque converter 34.

The main relief valve 62 ensures fluid pressure required for operating the transmission 33 and releasing the parking brake 4 and prevents excessive increase in the fluid pressure of the hydraulic fluid supplying circuit 6. Specifically, the fluid pressure of the transmission 33 and the parking brake 4 is set at a predetermined relief pressure (e.g., about 2.9 MPa (30 kgf/cm$^2$)) or less by opening and closing the main relief valve 62. When the transmission 33 is not activated and the parking brake 4 is not released, the main relief valve 62 is opened to deliver the hydraulic fluid to the torque converter 34.

The operation switching circuit 7 is branched from a conduit line 63 extending toward the transmission 33 of the hydraulic fluid supplying circuit 6. The operation switching circuit 7 includes an operation switching valve 71, a check valve 72, a relief valve 73, a solenoid valve 74, an emergency release valve 75, and an accumulator 76.

The operation switching valve 71 is a switching valve for switching an operation of the parking brake 4. The parking brake 4 is selectively connected to the hydraulic fluid supplying circuit 6 or the hydraulic fluid tank 8 by switching a valve position of the operation switching valve 71. When the parking brake 4 is connected to the hydraulic fluid supplying circuit 6, the hydraulic fluid is supplied to the brake cylinder 41 of the parking brake 4. When the parking brake 4 is connected to the hydraulic fluid tank 8, the hydraulic fluid is discharged from the brake cylinder 41 and returned to the hydraulic fluid tank 8. The valve position of the operation switching valve 71 is switched in accordance with an operation of an input unit such as a parking brake switch provided in the cab 31.

Since the parking brake 4 is provided in the casing of the transmission 33, return circuits to the hydraulic fluid supplying circuit 6 and the hydraulic fluid tank 8 are shared with the transmission 33, so that the parking brake hydraulic circuit 5 can be simplified. Since the same hydraulic fluid can be commonly used by sharing the circuits, for instance, mixing of different hydraulic fluids is avoided in the return circuit to the hydraulic fluid tank 8.

The check valve 72 is closer to the hydraulic fluid supplying circuit 6 than the operation switching valve 71 and prevents backflow of the hydraulic fluid of the parking brake 4 to the hydraulic fluid supplying circuit 6.

The relief valve 73 is interposed between the operation switching valve 71 and the check valve 72. When fluid pressure of the operation switching circuit 7 exceeds relief pressure (predetermined pressure), the hydraulic fluid is discharged from the operation switching circuit 7. Specifically, when fluid pressure of a conduit line 77 between the operation switching valve 71 and the check valve 72 is at the relief pressure or lower, the relief valve 73 blocks the connection between the operation switching circuit 7 and the hydraulic fluid tank 8. When the fluid pressure exceeds the relief pressure, the relief valve 73 connects the operation switching circuit 7 and the hydraulic fluid tank 8.

The solenoid valve 74 supplies or stops the hydraulic fluid from the accumulator 76. The solenoid valve 74 is closer to the parking brake 4 than the operation switching valve 71. When the hydraulic fluid is not supplied from the hydraulic fluid supplying circuit 6 or the operation switching valve 71 is not switched for some reason, the parking brake 4 is forcibly released through the emergency release valve 75. Specifically, when a valve position of the solenoid valve 74 is switched from a normal position at which the solenoid valve 74 connects the parking brake 4 and the hydraulic fluid tank 8 to a position at which the solenoid valve 74 connects the parking brake 4 and the accumulator 76, hydraulic fluid stored in the accumulator 76 is flowed toward the emergency release valve 75 to drive the emergency release valve 75. The valve position of the solenoid valve 74 is switched in accordance with the operation of the input unit such as an emergency release switch provided in the cab 31.

The emergency release valve 75 is provided in a hydraulic line 78 from the operation switching valve 71 to the parking brake 4. A valve position of the emergency release valve 75 is switched in accordance with switching of the solenoid valve 74 at a time of emergency release, thereby connecting the parking brake 4 and a hydraulic line 79 from the solenoid valve 74. Specifically, the emergency release valve 75 includes a first pilot line 751 to which fluid pressure between the operation switching valve 71 and the check valve 72 is applied and a second pilot line 752 to which fluid pressure of the solenoid valve 74 is applied. The valve position of the emergency release valve 75 is switched when the fluid pressure of the second pilot line 752 is higher than the fluid pressure of the first pilot line 751 by a predetermined value or more. In other words, when the hydraulic fluid of the accumulator 76 is flowed into the second pilot line 752 by switching the solenoid valve 74 to increase the fluid pressure of the second pilot line 752, the valve position of the emergency release valve 75 is switched to the valve position at the time of emergency release, thereby connecting the parking brake 4 and the accumulator 76. With this arrangement, the hydraulic fluid stored in the accumulator 76 is supplied to the brake cylinder 41 of the parking brake 4 through the solenoid valve 74 and the emergency release valve 75, thereby releasing the parking brake 4.

The pressure sensor 9 detects fluid pressure acting on the brake cylinder 41 of the parking brake 4. A detection signal from the pressure sensor 9 is used for checking reliability of the parking brake 4 and controlling of other devices in the wheel loader 1.

In the above parking brake hydraulic circuit 5, the hydraulic fluid supplying circuit 6 constantly supplies the hydraulic fluid by the hydraulic pumps 61A and 61B during rotation of the engine. Accordingly, when the operation switching valve 71 is switched by operating the input unit such as the parking brake switch, the hydraulic fluid from the hydraulic fluid supplying circuit 6 is supplied into the brake cylinder 41 to release the parking brake 4.

Even when the fluid pressure of the hydraulic fluid supplying circuit 6 is lowered by activation (e.g., gear shifting) of the transmission, the check valve 72 prevents backflow of the hydraulic fluid of the parking brake 4 to the hydraulic fluid supplying circuit 6. For this reason, the supplied hydraulic fluid is kept in the brake cylinder 41, so that the parking brake 4 is maintained in a released state. Accordingly, the parking brake 4 is not unintentionally released to prevent generation of brake drag during travelling.

In a case of a medium-small sized wheel loader 1 having a total weight of less than about 70 tons, since the transmission 33 is small in volume, a time for reducing fluid pressure at a time of gear shifting is 0.6 second or less. In this case, even though a drill hole or a slit is additionally formed in the check valve 72 in order to prevent a device (e.g., the pressure sensor 9) or a pipe from being damaged by increase in fluid pressure in accordance with increase in a fluid temperature, the operation of the parking brake 4 is not affected due to a limited leakage amount from the check valve 72.

On the other hand, in a case of a large sized wheel loader 1 having a total weight of about 70 tons or more, the transmission 33 larger than that of the medium-small sized wheel loader in volume is mounted. In this case, since a larger amount of the hydraulic fluid is required to activate a clutch of the transmission 33, a time for reducing fluid pressure of the hydraulic fluid supplying circuit 6 at a time of gear shifting exceeds 0.6 second. For this reason, when a drill hole or a slit is additionally formed in the check valve 72, a leakage amount from the check valve 72 is increased to affect the operation of the parking brake 4 to a large extent.

In contrast, in the wheel loader 1, when the fluid pressure of the operation switching circuit 7 exceeds the relief pressure of the relief valve 73 because of increase in the fluid temperature or the like, the relief valve 73 is opened, so that the hydraulic fluid of the operation switching circuit 7 is returned to the hydraulic fluid tank 8. Here, since the relief valve 73 is opened only when the fluid pressure of the operation switching circuit 7 exceeds the relief pressure, suitable fluid pressure required for releasing the parking brake 4 can be maintained. Accordingly, an excessive increase in the fluid pressure of the operation switching circuit 7 can be prevented, so that the device (e.g., the pressure sensor 9) or the pipe which are connected to the operation switching circuit 7 can be prevented from being damaged.

On the other hand, for activating the parking brake 4, the input unit (e.g., the parking brake switch) is operated to switch the operation switching valve 71 to a valve position where the parking brake 4 is activated. By this operation, the hydraulic fluid in the brake cylinder 41 is returned to the hydraulic fluid tank 8 through the operation switching valve 71, so that the parking brake 4 is activated by the biasing force of the spring 42.

As described above, since the wheel loader 1 includes the parking brake hydraulic circuit 5 having the check valve 72 and the relief valve 73, in which the check valve 72 prevents backflow of the hydraulic fluid to the hydraulic fluid supplying circuit 6, even when the fluid pressure of the hydraulic fluid supplying circuit 6 is lowered during activation of the transmission 33, or even when the fluid pressure of the operation switching circuit 7 is expected to be excessively increased by increase in the fluid temperature or the like, a suitable fluid pressure of the operation switching circuit 7 can be ensured to reliably maintain the released state of the parking brake 4.

Second Exemplary Embodiment

Next, a wheel loader 1 provided with a parking brake hydraulic circuit 5 according to a second exemplary embodiment of the invention will be described below based on FIG. 3.

In the parking brake hydraulic circuit 5 of the wheel loader 1 according to the first exemplary embodiment, the relief valve 73 discharges the hydraulic fluid of the parking brake 4 to the hydraulic fluid tank 8 when the fluid pressure of the parking brake 4 exceeds the relief pressure.

Figure 3:
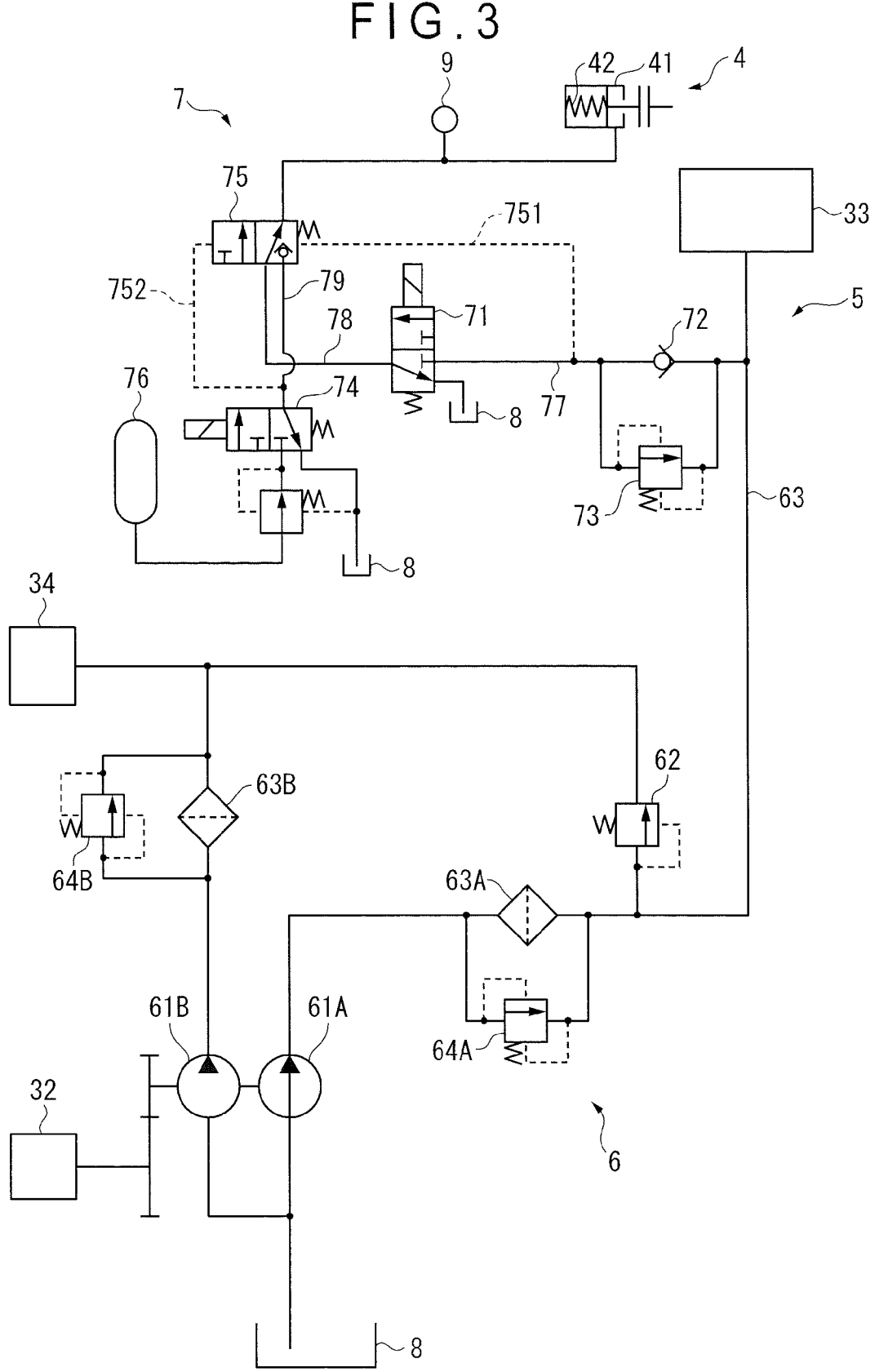
FIG. 3 shows an arrangement of a parking brake hydraulic circuit according to a second exemplary embodiment of the invention.

In contrast, the relief valve 73 in the parking brake hydraulic circuit 5 of the wheel loader 1 according to the second exemplary embodiment as shown in FIG. 3 discharges the hydraulic fluid of the parking brake 4 to the hydraulic fluid supplying circuit 6 when a difference in fluid pressure between the parking brake 4 and the hydraulic fluid supplying circuit 6 exceeds the relief pressure.

The wheel loader 1 according to the second exemplary embodiment can provide the same advantageous effects as those of the first exemplary embodiment by setting the relief pressure of the relief valve 73 of the parking brake hydraulic circuit 5 at a release pressure or more of the parking brake 4. Moreover, since a drain pipe that connects the relief valve 73 and the hydraulic fluid tank 8 is not required in the parking brake hydraulic circuit 5, the structure of the parking brake hydraulic circuit 5 can be simplified.

The scope of the present invention is not limited to the above-described embodiments, but includes modifications and improvements as long as an object of the present invention can be achieved.

Although the relief valve 73 openable by differential pressure is used in the second exemplary embodiment, any types of relief valves are applicable. For instance, a relief valve openable by a pilot pressure defined only by fluid pressure between the operation switching valve 71 and the check valve 72 may be used.

Although the parking brake hydraulic circuit 5 is used in the wheel loader 1 in the above exemplary embodiments, a construction machine to which the parking brake hydraulic circuit 5 is applied is not limited to the wheel loader 1. The parking brake hydraulic circuit 5 may be used in other construction machines such as a hydraulic excavator and a bulldozer. In addition to the construction machines, the parking brake hydraulic circuit 5 may be used in an industrial vehicle such as a forklift.

The invention claimed is:

1. A construction machine comprising:
a negative parking brake whose braking state is released by supply of hydraulic fluid; and
a parking brake hydraulic circuit that is branched from a hydraulic fluid supplying circuit supplying the hydraulic fluid to a transmission of the construction machine and supplies the hydraulic fluid to the parking brake,
the parking brake hydraulic circuit comprising:
a check valve that is provided closer to the parking brake than a branch portion from the hydraulic fluid supplying circuit and prevents backflow of the hydraulic fluid of the parking brake to the hydraulic fluid supplying circuit;
an operation switching valve that is provided closer to the parking brake than the check valve and switches between an activation and a release of the parking brake;
a relief valve that is interposed between the check valve and the operation switching valve and discharges the hydraulic fluid of the parking brake when the relief valve is opened;
an accumulator that accumulates hydraulic fluid therein;
a solenoid valve that supplies or stops the hydraulic fluid from the accumulator; and
an emergency release valve that is provided in a hydraulic line from the operation switching valve to the parking brake and connects the parking brake and a hydraulic line from the solenoid valve by switching a valve position of the emergency release valve to release the parking brake, wherein the emergency release valve comprises a first pilot line to which fluid pressure between the operation switching valve and the check valve is applied and a second pilot line to which fluid pressure of the solenoid valve is applied, and the valve position of the emergency release valve is switched when the fluid pressure of the second pilot line is higher than the fluid pressure of the first pilot line by a predetermined value or more.

2. The construction machine according to claim 1, wherein
the relief valve discharges the hydraulic fluid of the parking brake to the hydraulic fluid supplying circuit when a difference in fluid pressure between the parking brake and the hydraulic fluid supplying circuit across the check valve exceeds a relief pressure.

3. The construction machine according to claim 1, wherein
the construction machine is a wheel loader, and
the construction machine is provided with a transmission transmitting an output of an engine to wheels, wherein
decrease in fluid pressure of the hydraulic fluid supplying circuit in accordance with a gear shifting of the transmission continues for a predetermined time or more.

4. The construction machine according to claim 2, wherein
the construction machine is a wheel loader, and
the construction machine is provided with a transmission transmitting an output of an engine to wheels, wherein
decrease in fluid pressure of the hydraulic fluid supplying circuit in accordance with a gear shifting of the transmission continues for a predetermined time or more.

* * * * *